(12) United States Patent
Kim et al.

(10) Patent No.: US 11,620,333 B2
(45) Date of Patent: Apr. 4, 2023

(54) APPARATUS, SERVER, AND METHOD FOR PROVIDING CONVERSATION TOPIC

(71) Applicant: SAMSUNG ELECTRONICS CO., LTD., Suwon-si (KR)

(72) Inventors: Hue-yin Kim, Yongin-si (KR); Sang-Il Lee, Seongnam-si (KR); Sung-kyu Lee, Suwon-si (KR); Seong-seol Hong, Yongin-si (KR); Jung-hoon Shin, Hwaseong-si (KR); Yeon-woo Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 17/362,091

(22) Filed: Jun. 29, 2021

(65) Prior Publication Data

US 2021/0326380 A1 Oct. 21, 2021

Related U.S. Application Data

(63) Continuation of application No. 14/452,170, filed on Aug. 5, 2014, now Pat. No. 11,048,750.

(30) Foreign Application Priority Data

Aug. 5, 2013 (KR) .................. 10-2013-0092663

(51) Int. Cl.
*G06F 16/68* (2019.01)
*G10L 15/26* (2006.01)
(Continued)

(52) U.S. Cl.
CPC .......... *G06F 16/686* (2019.01); *G06F 16/313* (2019.01); *G10L 15/26* (2013.01);
(Continued)

(58) Field of Classification Search
None
See application file for complete search history.

(56) References Cited

U.S. PATENT DOCUMENTS 6,332,122 B1 * 12/2001 Ortega ................ G10L 15/26
704/270
7,117,152 B1 * 10/2006 Mukherji ............ G10L 19/0018
704/235

(Continued)

FOREIGN PATENT DOCUMENTS

CN 101611398 A 12/2009
CN 102016502 A 4/2011
(Continued)

OTHER PUBLICATIONS

Communication dated Jul. 22, 2021, issued by the Korean Patent Office in counterpart Korean Patent Application No. 10-2021-0031470.
(Continued)

*Primary Examiner* — Marcus T Riley
(74) *Attorney, Agent, or Firm* — Sughrue Mion, PLLC

(57) ABSTRACT

A conversation topic providing method includes: converting voice data, of a conversation of a user who is on a phone, into text; selecting a keyword, indicating an intention of the user, from the text; obtaining information of interest with respect to the keyword; and determining topics relating to the keyword based on user information.

20 Claims, 10 Drawing Sheets

(51) Int. Cl.
  *H04L 51/10* (2022.01)
  *H04L 51/046* (2022.01)
  *G06F 16/31* (2019.01)
  *H04L 51/066* (2022.01)
  *H04L 51/52* (2022.01)
(52) U.S. Cl.
  CPC ............ *H04L 51/046* (2013.01); *H04L 51/10* (2013.01); *H04L 51/066* (2013.01); *H04L 51/52* (2022.05)

(56) References Cited

U.S. PATENT DOCUMENTS

| | | | |
|---|---|---|---|
| 7,469,384 B2 | 12/2008 | Thompson et al. | |
| 8,060,565 B1* | 11/2011 | Swartz | G10L 13/00 704/4 |
| 8,464,297 B2 | 6/2013 | Yao | |
| 8,515,888 B2* | 8/2013 | Ventilla | G06Q 10/10 706/45 |
| 8,554,254 B2* | 10/2013 | May | H04M 1/72433 455/414.4 |
| 8,731,531 B2* | 5/2014 | May | H04W 4/16 455/563 |
| 9,064,494 B2* | 6/2015 | Holtel | G10L 15/22 |
| 9,444,772 B2* | 9/2016 | Ventilla | H04L 51/046 |
| 9,858,921 B2* | 1/2018 | Singleton | G10L 15/22 |
| 11,271,765 B2* | 3/2022 | Bujnowski | G06F 40/10 |
| 2002/0172336 A1* | 11/2002 | Postma | H04M 3/533 455/344 |
| 2003/0097262 A1* | 5/2003 | Nelson | H04M 1/72403 704/235 |
| 2004/0073424 A1* | 4/2004 | Geppert | G10L 15/26 704/235 |
| 2008/0147514 A1* | 6/2008 | Shuster | G06Q 30/0633 705/26.8 |
| 2008/0201434 A1 | 8/2008 | Holmes et al. | |
| 2009/0292526 A1 | 11/2009 | Harari et al. | |
| 2009/0307090 A1 | 12/2009 | Gupta et al. | |
| 2010/0228732 A1 | 9/2010 | Rhee et al. | |
| 2011/0015926 A1 | 1/2011 | Kim | |
| 2011/0125501 A1* | 5/2011 | Holtel | G10L 15/22 704/E15.001 |
| 2011/0125744 A1 | 5/2011 | Immonen et al. | |
| 2011/0131207 A1* | 6/2011 | Jonsson | G06Q 10/107 707/730 |
| 2012/0191730 A1* | 7/2012 | Parikh | G06Q 40/06 707/754 |
| 2012/0303452 A1 | 11/2012 | Xue et al. | |
| 2013/0110502 A1* | 5/2013 | Issa | H04H 60/47 704/235 |
| 2013/0173725 A1* | 7/2013 | Ventilla | H04L 12/66 709/206 |
| 2014/0067375 A1* | 3/2014 | Wooters | G06F 40/35 704/9 |
| 2014/0237057 A1* | 8/2014 | Khodorenko | H04L 12/1831 709/206 |
| 2015/0039308 A1* | 2/2015 | Kim | G06F 16/313 704/235 |
| 2015/0261389 A1* | 9/2015 | Abate | H04L 65/1059 715/741 |
| 2021/0326380 A1* | 10/2021 | Kim | G06F 16/313 |

FOREIGN PATENT DOCUMENTS

| | | |
|---|---|---|
| CN | 102866990 A | 1/2013 |
| CN | 102972041 A | 3/2013 |
| EP | 1457862 A1 | 9/2004 |
| JP | 2013-5445 A | 1/2013 |
| KR | 2002-0039281 A | 5/2002 |
| KR | 10-0725719 B1 | 6/2007 |
| KR | 10-2008-0109322 A | 12/2008 |
| KR | 10-0895535 B1 | 4/2009 |
| KR | 10-2010-0094282 A | 8/2010 |
| KR | 10-2011-0022834 A | 3/2011 |

OTHER PUBLICATIONS

Communication dated Feb. 10, 2017, issued by the European Patent Office in counterpart European Patent Application No. 14834146.4.
Communication dated Apr. 28, 2018, from the State Intellectual Property Office of People's Republic of China in counterpart Application No. 201480044791.6.
International Search Report dated Nov. 10, 2014 issued by International Searching Authority in counterpart International Patent Application No. PCT/KR2014/007075.
Written Opinion dated Nov. 10, 2014 issued by International Searching Authority in counterpart International Patent Application No. PCT/KR2014/007075.
Communication dated Jan. 3, 2019, from the State Intellectual Property Office of People's Republic of China in counterpart Application No. 201480044791.6.
Communication dated May 19, 2020, issued by the Korean Intellectual Property Office in corresponding Korean Application No. 10-2013-0092663.
Communication dated Jun. 27, 2019 issued by the State Intellectual Property Office of P.R. China in counterpart Chinese Application No. 201480044791.6.
Communication dated Aug. 27, 2020 by the Indian Patent Office in counterpart Application No. 201627001409.
Communication dated Nov. 5, 2020, issued by the Korean Intellectual Property Office in corresponding Korean Application No. 10-2013-0092663.
Communication dated Dec. 3, 2021 issued by the State Intellectual Property Office of P.R. China in English counterpart Chinese application No. 201911347506.9.

* cited by examiner

APPARATUS, SERVER, AND METHOD FOR PROVIDING CONVERSATION TOPIC

CROSS-REFERENCE TO RELATED PATENT APPLICATION(S)

This application is a Continuation Application of U.S. application Ser. No. 14/452,170, filed on Aug. 5, 2014, which claims the benefit of Korean Patent Application No. 10-2013-0092663, filed on Aug. 5, 2013, in the Korean Intellectual Property Office, the disclosure of which is incorporated herein in its entirety by reference.

BACKGROUND

1. Field

Apparatuses and methods consistent with exemplary embodiments relate to an apparatus, server, and method for providing a conversation topic.

2. Description of the Related Art

A television or a smart phone is an apparatus that displays an image viewable by a user and provides the user with information. Recently, users have used televisions not only to view broadcast programs, but also to search for information on the Internet or to call other users.

In the related art, when a user converses with another user by using a television capable of making a video call, the television may provide the user with information and an image like an advertisement. While the user is on the phone, he or she may want to obtain information which is useful for their conversation. However, it is inconvenient for the user to input characters while on the phone, and it takes time for the user to search for information. Thus, there is need to provide the user with useful information to help in the user's conversation while they are on the phone.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments provide an apparatus, server, and method for providing a conversation topic to a user who is on the phone.

Additional aspects will be set forth in part in the description which follows and, in part, will be apparent from the description, or may be learned by practice of exemplary embodiments.

According an aspect of an exemplary embodiment, there is provided a conversation topic providing method including: converting voice data, of a conversation of a user who is on a phone, into text; selecting a keyword, indicating an intention of the user, from the text; obtaining information of interest with respect to the keyword; and determining topics relating to the keyword based on information of the user.

According to an aspect of another exemplary embodiment, there is provided a conversation topic providing apparatus including: a text converter configured to convert voice data, of a conversation of a user who is on a phone, into text; a keyword selector configured to select a keyword, indicating an intention of the user, from the text; an information of interest obtainer configured to obtain information of interest with respect to the keyword; and a topic determiner configured to determine topics relating to the keyword based on information of the user.

According an aspect of another exemplary embodiment, there is provided a server including: a receiver configured to receive text converted from voice data of a conversation of a user who is on a phone; an information processor configured to select a keyword, indicating an intention of the user, from the text, obtain information of interest with respect to the keyword, and determine topics relating to the keyword based on user information; and a transmitter configured to transmit the information of interest and the topics.

According to an aspect of another exemplary embodiment, there is provided a display apparatus including: a keyword selector configured to select a keyword, indicating an intent of the user, from voice data of a phone conversation of the user; an information of interest obtainer configured to obtain information of interest based on the selected keyword; and a display configured to display the information of interest.

BRIEF DESCRIPTION OF THE DRAWINGS

The above and/or other aspects will become more apparent and more readily appreciated by describing in detail exemplary embodiments, taken in conjunction with the accompanying drawings in which.

DETAILED DESCRIPTION OF EXEMPLARY EMBODIMENTS

Certain exemplary embodiments will now be described in detail with reference to the accompanying drawings.

Figure 1:
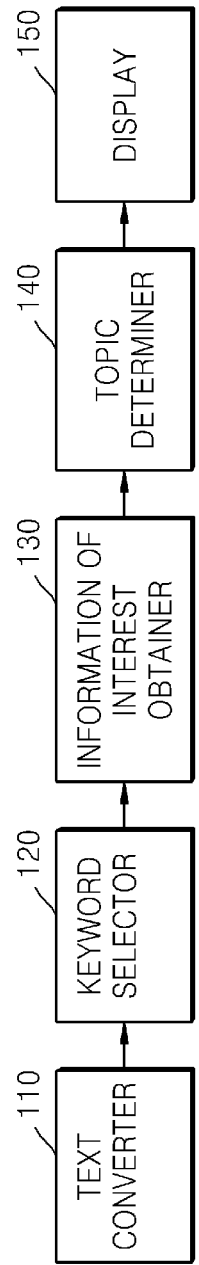
FIG. 1 is a block diagram of a conversation topic providing apparatus, according to an exemplary embodiment.

In the following description, like drawing reference numerals are used for the same elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure exemplary embodiments with unnecessary detail. FIG. 1 is a block diagram of a conversation topic providing apparatus 100, according to an exemplary embodiment.

Referring to FIG. 1, the conversation topic providing apparatus 100 includes a text converter 110, a keyword selector 120, an information of interest obtainer 130, a topic determiner 140, and a display 150. The conversation topic providing apparatus 100 provides a user with conversation topics through the display 150 such that the user who is on the phone may continue their conversation.

It is inconvenient for the user to input characters and search for information while on the phone. Thus, it is necessary to analyze the user's conversation and provide the user with information that the user desires so that the user does not need to directly input characters to perform a search.

For example, the user may want to elaborate on a topic that has been mentioned in his or her conversation. In this case, detailed information regarding the topic that has been mentioned may be provided to the user to assist the user in their conversation.

Similarly, during the user's conversation, they may want to check previous conversation content or a place that the user has visited. Thus, the user's previous conversation content or the place that the user has visited before may be displayed during the user's conversation.

The conversation topic providing apparatus 100 may determine information desired by the user and provide the user with the information.

The conversation topic providing apparatus 100 is an image or information display apparatus and may be implemented as, for example, a television, a smart phone, or a tablet personal computer (PC).

The conversation topic providing apparatus 100 may be an image call apparatus or a voice call apparatus. The conversation topic providing apparatus 100 may be connected to an external server for processing information over a network and may transmit and receive the information with the external server.

The text converter 110 converts voice data input during the user's conversation into text. The voice data refers to a user's voice input into the conversation topic providing apparatus 100 while the user is on the phone with the other party. The voice data may include the user's voice as well as a voice of the other party who is on the phone with the user.

The text converter 110 outputs the converted text to the keyword selector 120.

The keyword selector 120 selects a keyword indicating a user's intention from the text. For instance, the keyword selector 120 selects a keyword indicating what the user would like to talk about in their conversation. The keyword may be one or more words, and may be selected in consideration of a user's intention, context, opinion, or sentiment that may be recognized during the user's conversation. The keyword may be selected in consideration of the user's conversation as well as a previous conversation history, a social network service (SNS) message, or a short message service (SMS) message. That is, when a word contains multiple meanings, the keyword selector 120 may determine that the word has one of the multiple meanings based on the previous conversation history.

The keyword selector 120 may select a repetitive word from the text as the keyword or, when a plurality of words are used in the same category, may select a category as the keyword. The keyword selector 120 may select the keyword by searching for a plurality of pieces of information that are uploaded to a user's SNS account or characters input by the user.

If a word such as a place, a time, or a person is detected in the text, the keyword selector 120 may determine the word indicating the place, the time, or the person as the keyword. If adjacent words indicating the place, the time, the person, and the like are detected, the keyword selector 120 may determine the detected words as combination keywords. For example, if two or more of the words indicating the place, the time, the person, and the like are detected, the detected two or more words are determined as combination keywords.

The keyword selector 120 outputs the selected keyword to the information of interest obtainer 130.

The information of interest obtainer 130 obtains information of interest regarding the keyword. The information of interest is detailed information identical to the keyword. In other words, the information of interest is detailed information that the user is interested in among the plurality of pieces of information found by using the keyword.

The information of interest may be a collection of information desired by the user among homepages obtained by searching for the keyword or from the plurality of pieces of found information. That is, the detailed information provided by searching for the keyword and selecting information that is the most consistent with the user's intention from found keyword results may be the information of interest. The information of interest may be generated by extracting some of the plurality of pieces of found information and reconfiguring the extracted information. That is, the information of interest may be edited according to the user's intention.

The information of interest obtainer 130 may obtain the information of interest by using a user's device or a user's SNS account. In other words, the information of interest obtainer 130 may obtain the information of interest by searching for information stored in a user's device other than the user's device that is currently in use for the user's conversation. The information of interest obtainer 130 may obtain the information of interest by logging into the user's SNS account and searching for writing, a photo, or a comment that the user has uploaded to his or her SNS account.

The information of interest obtainer 130 may search for a word identical to the word indicating the place, the time, or the person in the user's SMS or SNS account and obtain the writing, the photo, or the comment that includes the identical word and that the user has uploaded in the user's SMS or SNS as the information of interest. In other words, if the keyword selector 120 selects the word indicating the place, the time, or the person as the keyword, the information of interest obtainer 130 obtains the identical word by searching for user information, i.e. a user conversation history, the user's SMS, or the user's SNS account. If the information of interest obtainer 130 discovers the word identical to the keyword in the user conversation history, the user's SMS, or the user's SNS, the information of interest obtainer 130 obtains a part of the user conversation history or content posted on the user's SMS or SNS account that includes the identical word. The user may obtain information regarding the place, the time, or the person that has been mentioned during the user's conversation by checking the obtained information of interest. This will be described in more detail with reference to FIG. 11.

The topic determiner 140 determines topics related to the keyword based on the user information. The user information includes information regarding the user such as a previous conversation history, an SMS message, an SNS message, a mobile messenger text, an interest, a search history, or a place that the user frequently visits. The user information includes information that may be obtained from various devices that the user possesses.

A search of the user's SNS account may be possible when a login to the user's SNS account is allowed by the user or when the user is logged in already. Conversation content between the user and user's friends over the mobile messenger may be included in the user information.

Types of topics may include sub topics and related topics. A sub topic is a topic corresponding to a sub concept of the keyword. A related topic is a topic corresponding to a concept equivalent to the keyword. The sub topic may include a sub topic of the related topic. In more detail, the sub topic and the related topic may be determined and displayed in the form of the keyword.

The topic determiner 140 determines topics by using the user information and the keyword. The topic determiner 140 may search for the user information, discover information identical to the keyword, and determine the identical information as a topic.

The topic determiner 140 may generate a user interest model by using the user information and determine the topics by using the user interest model and the keyword.

The user interest model may be a previously determined model including fields that the user is interested in. The user interest model may be updated whenever the user information is updated. In other words, if there is a user's activity, such as the user visiting a web site or using an application, the user interest model is updated based on the user's activity.

For example, the user interest model may be updated by correcting a weight given to each of a plurality of topic candidates whenever the user information is updated. That is, the user interest model may include the plurality of topic candidates. The weight is given to each of the plurality of topic candidates. The weight may be corrected whenever the user information is updated.

The topic determiner 140 may set fields that the user is interested in by using the user information, and, if the keyword is input, may determine the topics in the fields related to the input keyword. The topic determiner 140 may determine the sub topic in the field of a sub concept related to the keyword and determine the related topic in the field of a concept equivalent to the keyword.

The text converter 110, the keyword selector 120, the information of interest obtainer 130, and the topic determiner 140 may be implemented by one or more processors, hardware modules, or a circuits performing their respective functions.

The display 150 may display the information of interest and the topics. The display 150 may display the information of interest only or may display the information of interest and topics simultaneously. The display 150 may display the information of interest to be the largest in a display region and the topics to be smaller than the information of interest. The topics may be displayed at the bottom of the display region. The display 150 may display the keyword along with the information of interest and the topics. In this regard, if the keyword is changed during the user's conversation, the display 150 may display previous keywords in a part of the display region. This will be described in more detail with reference to FIG. 9.

The display 150 may display a graph illustrating relationships between the keyword and the topics. That is, the display 150 may display the graph illustrating relationships between the keyword and the sub topic or the related topics. This will be described in more detail with reference to FIG. 10.

The user may obtain information that the user is interested in by using the information of interest and the topics displayed on the display 150 and further continue the conversation with the other party by using the information.

The display 150 is a screen of the television or the smart phone. For example, the display 150 may be implemented in the form of a liquid crystal display (LCD) apparatus, a plasma display panel, an organic electroluminescence panel, etc.

Figure 2:
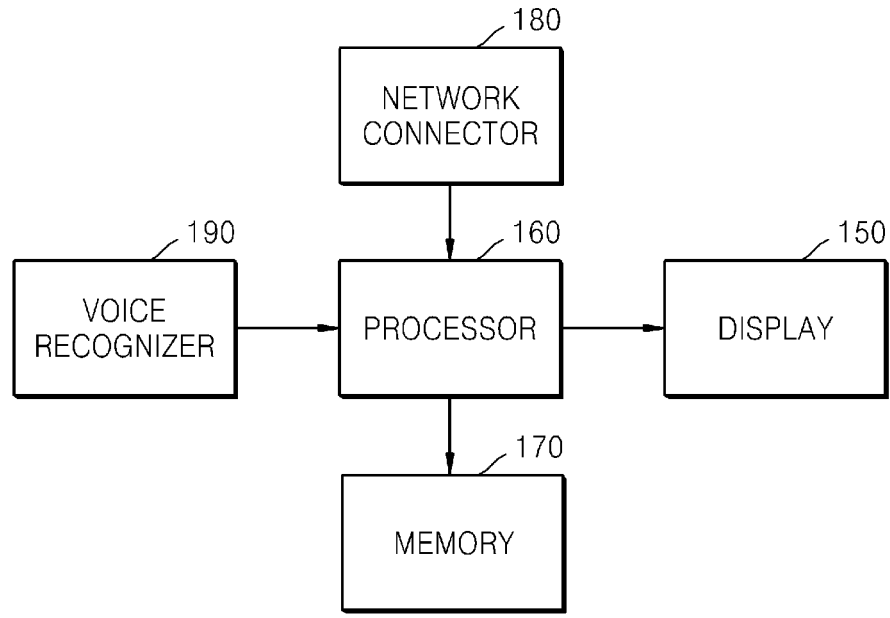
FIG. 2 is a block diagram of a conversation topic providing apparatus, according to another exemplary embodiment.

FIG. 2 is a block diagram of the conversation topic providing apparatus 100, according to another exemplary embodiment. The conversation topic providing apparatus 100 of FIG. 2 is another exemplary embodiment of the conversation topic providing apparatus 100 of FIG. 1. Thus, although omitted here, the descriptions relating to the conversation topic providing apparatus 100 that have been provided with reference to FIG. 1 apply to the conversation topic providing apparatus 100 of FIG. 2.

Referring to FIG. 2, the conversation topic providing apparatus 100 includes a voice recognizer 190, a processor 160, the display 150, a memory 170, and a network connector 180.

The voice recognizer 190 recognizes a user's voice. For example, the voice recognizer 190 is a device, such as a microphone, that converts sound into an electrical signal.

The processor 160 provides a user with conversation topics by using voice data input from the voice recognizer 190. The processor 160 may obtain information from a server by using the network connector 180 and obtain information stored in the memory 170. The processor 160 may obtain information of interest desired by the user who is on the phone by using the obtained information and voice data, determine topics, and output the information of interest and the topics to the display 150.

The processor 160 may be connected to the network connector 180, the memory 170, the display 150, as well as the voice recognizer 190 to input and output data therebetween.

The processor 160 may be connected to an external device or the server over the network connector 180. The processor 160 may search for or obtain information stored in the external device or the server over the network connector 180. For example, the processor 160 may transmit a keyword selected from the voice data and obtain the information of interest from the server.

The processor 160 may use information stored in the memory 170. The memory 170 stores information regarding a user's SNS account, a user's SMS, a photo, an application installed therein, and the like.

The processor 160 may generate and update a user interest model. The processor 160 may determine the topics by generating the user interest model based on user information and inputting the selected keyword into the user interest model. The processor 160 may reflect the selected keyword and update the user interest model whenever the keyword is selected.

The text converter 110, the keyword selector 120, the information of interest obtainer 130, and the topic determiner 140 of FIG. 1 may be included in the processor 160.

The processor 160 is an apparatus for processing input data, and may be implemented as an array of a plurality of logic gates and as a combination of a general-purpose microprocessor and a memory storing a program that may be executed by the general-purpose microprocessor. It will be understood by those of ordinary skill in the art that the processor 160 may be implemented as different types of hardware.

Figure 3:
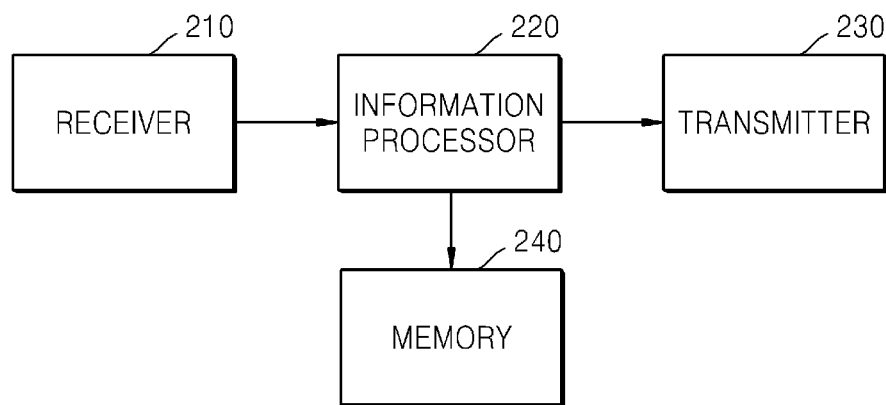
FIG. 3 is a block diagram of a server according to an exemplary embodiment.

FIG. 3 is a block diagram of a server 200 according to an exemplary embodiment. Referring to FIG. 3, the server 200 includes a receiver 210, an information processor 220, a transmitter 230, and a memory 240. The server 200 may select information of interest or determine topics based on information received from the conversation topic providing apparatus 100. The server 200 transmits the information of interest or the topics to the conversation topic providing apparatus 100 by using the transmitter 230.

The receiver 210 receives data from the conversation topic providing apparatus 100. The received data may be voice data or text converted from the voice data. The receiver 210 may also receive a keyword.

The receiver 210 outputs the data received from the conversation topic providing apparatus 100 to the information processor 220.

The receiver 210 or the transmitter 230 may be a device that sends or receives electromagnetic waves in wired or wireless communication.

The information processor 220 may select the information of interest or determine the topics by using the data input through the receiver 210.

If the information processor 220 receives the input voice data, the information processor 220 converts the input voice data into text. The voice data is recorded data of a user's voice input while a user is on the phone with the other party. The voice data is recorded by using the conversation topic providing apparatus 100. The voice data may include the user's voice as well as a voice of the other party who is on the phone with the user.

The information processor 220 selects a keyword indicating a user's intention from the text. The keyword may be one or more words, and may be selected in consideration of a user's intention, context, opinion, or sentiment that may be recognized during a user's conversation. The keyword may be selected in consideration of the user's conversation as well as the user's previous conversation history, an SNS, or an SMS.

The keyword processor 220 may select a repetitive word from the text as the keyword or, when a plurality of words are used in the same category, may select a category as the keyword.

The keyword processor 220 may select the keyword by searching for a plurality of pieces of information that are uploaded to a user's SNS account or characters of the user.

If a word such as a place, time, or a person is detected in the text, the keyword processor 220 may determine the word indicating the place, the time, or the person as the keyword. If adjacent words indicating the place, the time, the person, and the like are detected, the keyword processor 220 may determine the detected words as combination keywords.

The information processor 220 obtains information of interest regarding the input keyword.

The information processor 220 may obtain the information of interest by using a user's device or the user's SNS account. In other words, the information processor 220 may obtain the information of interest by searching for information stored in a user's device other than the user's device that is currently in use for the user's conversation. The information processor 220 may obtain the information of interest by logging into the user's SNS account and searching for writing, a photo, or a comment that the user has uploaded to the user's SNS account. The SNS refers to writings, photos, or comments that the user has uploaded to an SNS that may be logged in to a user's account. The SMS refers to messages that the user sends and receives in the user's own device.

The information processor 220 may search for a word identical to the word indicating the place, the time, or the person in a user's SMS or SNS account and may obtain the user's SMS message or SNS message that includes the identical word as the information of interest. In other words, if the information processor 220 selects the word indicating the place, the time, or the person as the keyword, the information processor 220 obtains the identical word by searching for user information, i.e. a user conversation history, the user's SMS message, or the user's SNS message. If the information processor 220 discovers the word identical to the keyword in the user conversation history, the user's SMS, or the user's SNS, the information of interest obtainer 130 obtains a part of the user conversation history or content posted on the user's SMS or SNS that include the identical word. The user may obtain information regarding the place, the time, or the person that has been mentioned during the user's conversation by checking the obtained information of interest.

The information processor 220 determines topics related to the keyword based on the user information. The user information includes information regarding the user such as a previous conversation history, an SMS message, an SNS message, a mobile messenger text, an interest, a search history, or a place that the user frequently visits. The user information includes information that may be obtained from various devices that the user possesses.

The information processor 220 determines topics by using the user information and the keyword. The information processor 220 may search for the user information, discover information identical to the keyword, and determine the identical information as the topics.

The information processor 220 may generate a user interest model by using the user information and determine the topics by using the user interest model and the keyword. The user interest model may be a previously determined model including fields that the user is interested in.

The user interest model may be updated whenever the user information is updated. In other words, if there is a user's activity, such as the user visits a web site or uses an application, the user interest model is updated based on the user's activity.

The information processor 220 may set fields that the user is interested in by using the user information, and, if the keyword is input, may determine the topics in the fields related to the input keyword. The information processor 220 may determine a sub topic in a field of a sub concept related to the keyword and determine a related topic in a field of a concept equivalent to the keyword.

The memory 240 stores data processed by the information processor 220 or stores data indicating the user interest model generated by the information processor 220.

The memory 240 is a non-volatile storage medium, and may be, for example, a hard disk drive, a flash memory, a solid state disk (SSD), a magnetic recording medium, etc.

Figure 4:
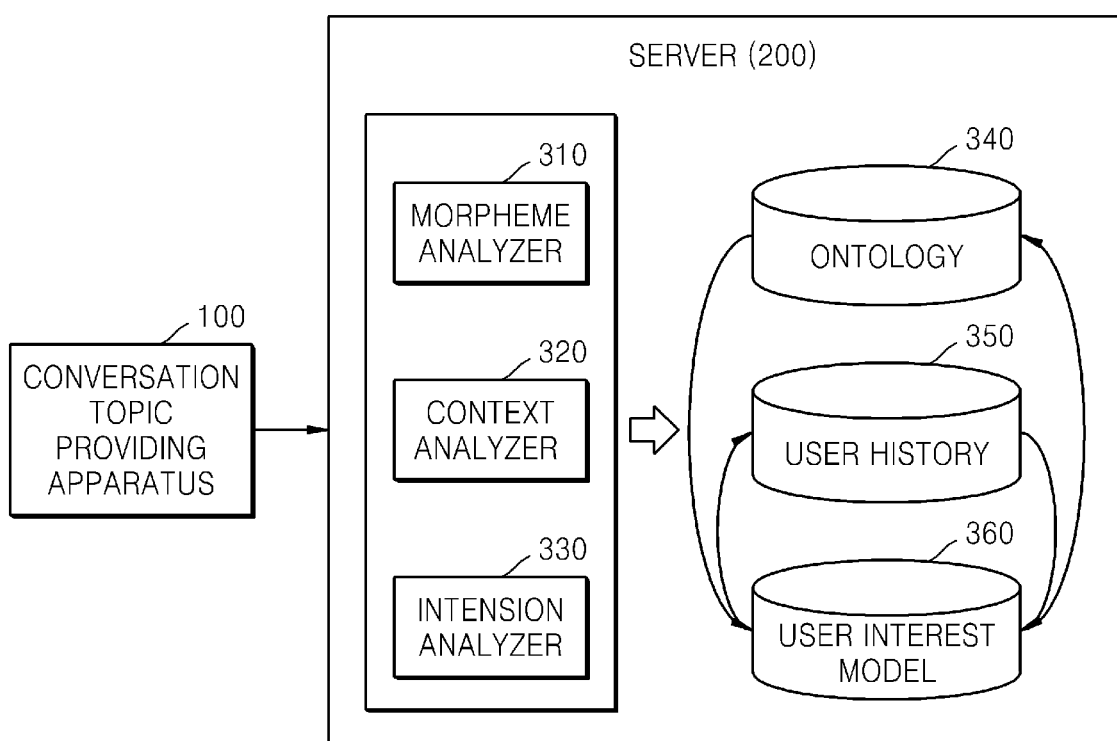
FIG. 4 is a block diagram of a server, according to another exemplary embodiment.

FIG. 4 is a block diagram of the server 200 according to an exemplary embodiment. The server 200 of FIG. 4 is another embodiment of the server 200 of FIG. 3. Thus, although omitted here, the descriptions relating to the server 200 that have been provided with reference to FIG. 3 apply to the server 200 of FIG. 4.

Referring to FIG. 4, the server 200 includes a morpheme analyzer 310, a context analyzer 320, and an intension analyzer 330, and stores an ontology 340, a user history 350, and a user interest model 360.

The server 200 may analyze text and interpret what a user would like to talk about in their conversation (i.e., the user's conversation intention). In more detail, the server 200 may identify morphemes of words included in the text, interpret meanings of the morphemes in context, and interpret the user's conversation intention.

The morpheme analyzer 310 recognizes nouns, verbs, articles, or postpositions included in the text. That is, the morpheme analyzer 310 determines a part of speech of each of the words included in the text. Analysis by the morpheme analyzer 310 may be an initial step performed when the server 200 receives the text.

The context analyzer 320 analyzes the context of sentences or the words included in the text. Although the same words are included in the text, the context analyzer 320 may interpret the same words as having different meanings according to the context of the sentences. The context analyzer 320 analyzes the context based on a result of morpheme analysis after the morpheme analyzer 310 completely analyzes the morphemes.

The intention analyzer 330 analyzes a user's intention included in the text. In other words, the intention analyzer 330 analyzes what the user would like to talk about in their conversation. The intention analyzer 330 may determine the user's intention through the meanings of the words interpreted by the context analyzer 320.

The server 200 collects and stores the user history 350. The server 200 may determine the user's intention by using the stored user history 350 and determine information of interest or a user topic. The server 200 may include the conversation topic providing apparatus 100 to collect information from a website that the user accesses.

The server 200 may store the user history 350 to generate the user interest model 360.

The server 200 may periodically update the user history 350.

The server 200 generates and stores the user interest model 360. The server 200 may generate the user interest model 360 by using the user history 350.

The server 200 may reconfigure the information of interest or the user topic by using the ontology 340. The ontology 340 is a database used to reconfigure input information. For example, when the information of interest includes pictures, images, or characters, the server 200 determines how to configure information such as pictures, images, or characters. The server 200 determines an arrangement of the information of interest or the user topic.

The server 200 may transmit the reconfigured information to the conversation topic providing apparatus 100.

Figure 5:
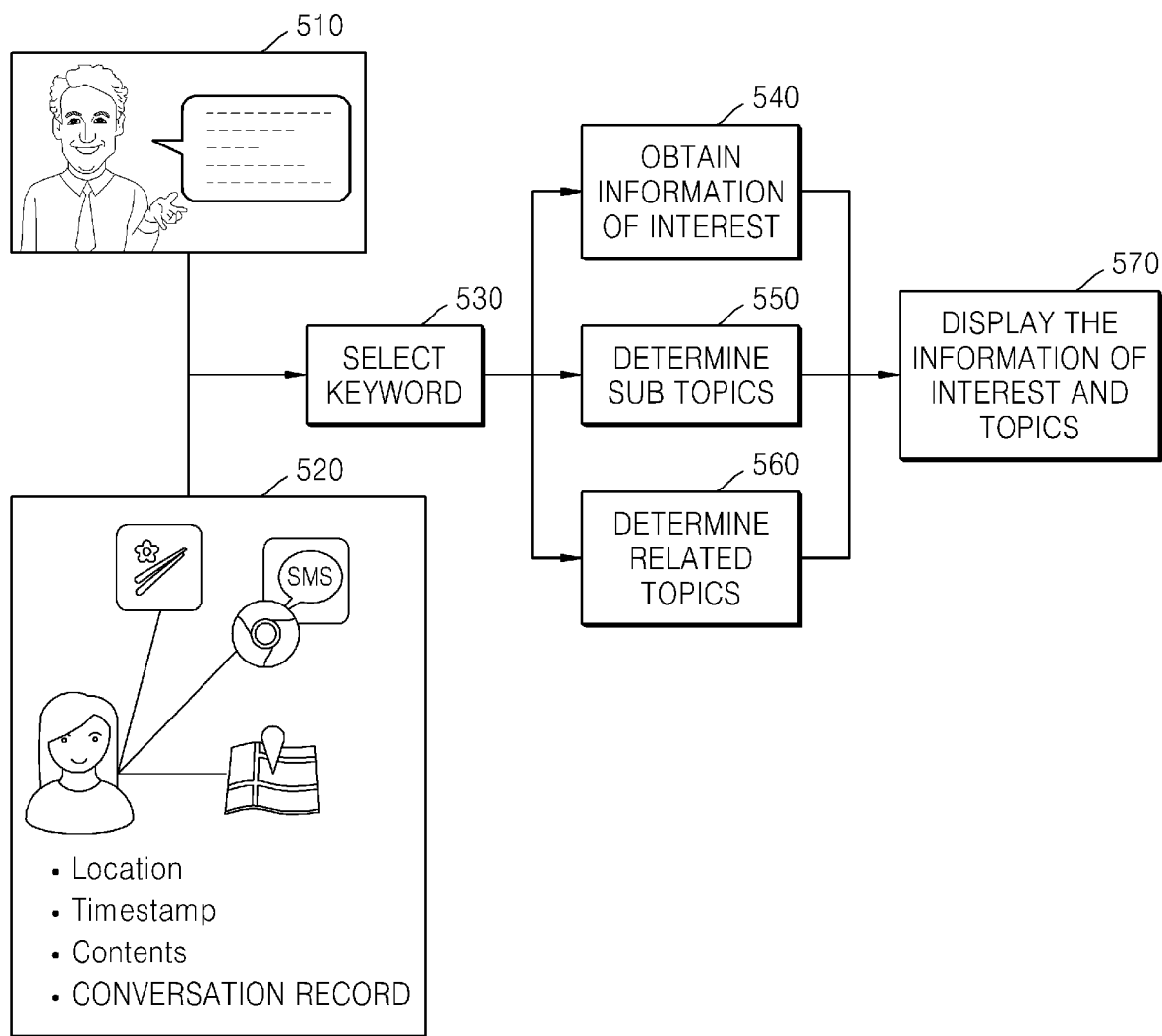
FIG. 5 is a block flow diagram for explaining a conversation topic providing method, according to an exemplary embodiment.

FIG. 5 is a block flow diagram for explaining a conversation topic providing method, according to an exemplary embodiment. Referring to FIG. 5, the conversation topic providing apparatus 100 displays information of interest and topics by using a user conversation and user information.

In FIG. 5, the conversation topic providing apparatus 100 may use the user information in selecting a keyword. In other words, the conversation topic providing apparatus 100 may select the keyword based on the user information while selecting the keyword by analyzing the user conversation.

A block 510 indicates the user conversation. In block 510, the conversation topic providing apparatus 100 obtains user voice data.

A block 520 indicates the user information. The user information may include information regarding a current location of a user or a place that the user frequently visits.

In operation 530, the keyword is selected based on the user information, which may be performed by the conversation topic providing apparatus 100 or the server 200. For example, the keyword may be selected according to the current location of the user. When the user moves, a new keyword may be selected according to a moving route of the user. If the keyword is selected, operation 540 resumes.

In operation 540, the conversation topic providing apparatus 100 or the server 200 obtains information of interest with respect to the selected keyword.

In operation 550, the conversation topic providing apparatus 100 or the server 200 determines a sub topic.

In operation 560, the conversation topic providing apparatus 100 or the server 200 determines a related topic.

Operations 540 through 560 may be performed sequentially or concurrently.

In operation 570, the conversation topic providing apparatus 100 displays the information of interest and topics. The server 200 transmits the information of interest and the topics to the conversation topic providing apparatus 100. Operation 570 is performed after operations 540 through 560 are performed. However, the conversation topic providing apparatus 100 may display the information of interest preferentially in operation 570 when operation 540 is performed earlier than operations 550 and 560.

Figure 6:
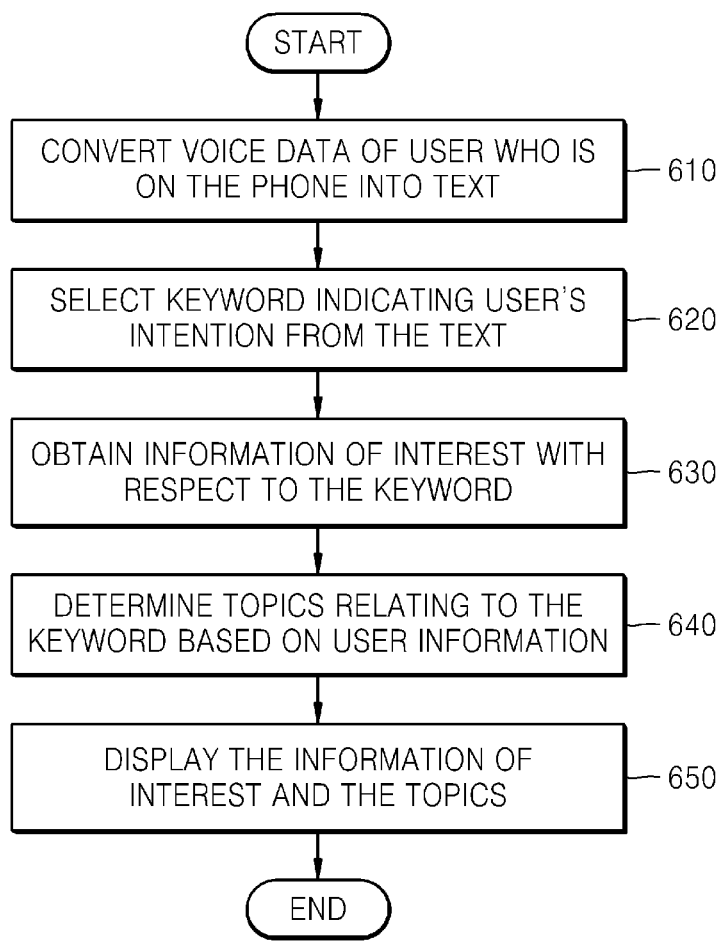
FIG. 6 is a flowchart of a conversation topic providing method, according to an exemplary embodiment.

FIG. 6 is a flowchart of a conversation topic providing method, according to an exemplary embodiment. FIG. 6 is another exemplary embodiment of the conversation topic providing apparatus 100 of FIG. 1. Thus, although omitted here, the descriptions relating to the conversation topic providing apparatus 100 that have been provided with reference to FIG. 1 apply to the conversation topic providing apparatus 100 of FIG. 6.

In operation 610, the conversation topic providing apparatus 100 converts voice data of a user who is on the phone into text.

In operation 620, the conversation topic providing apparatus 100 selects a keyword indicating a user's intention from the text.

In operation 630, the conversation topic providing apparatus 100 obtains information of interest with respect to the keyword.

In operation 640, the conversation topic providing apparatus 100 determines topics relating to the keyword based on user information.

In operation 650, the conversation topic providing apparatus 100 displays the information of interest and the topics.

Figure 7:
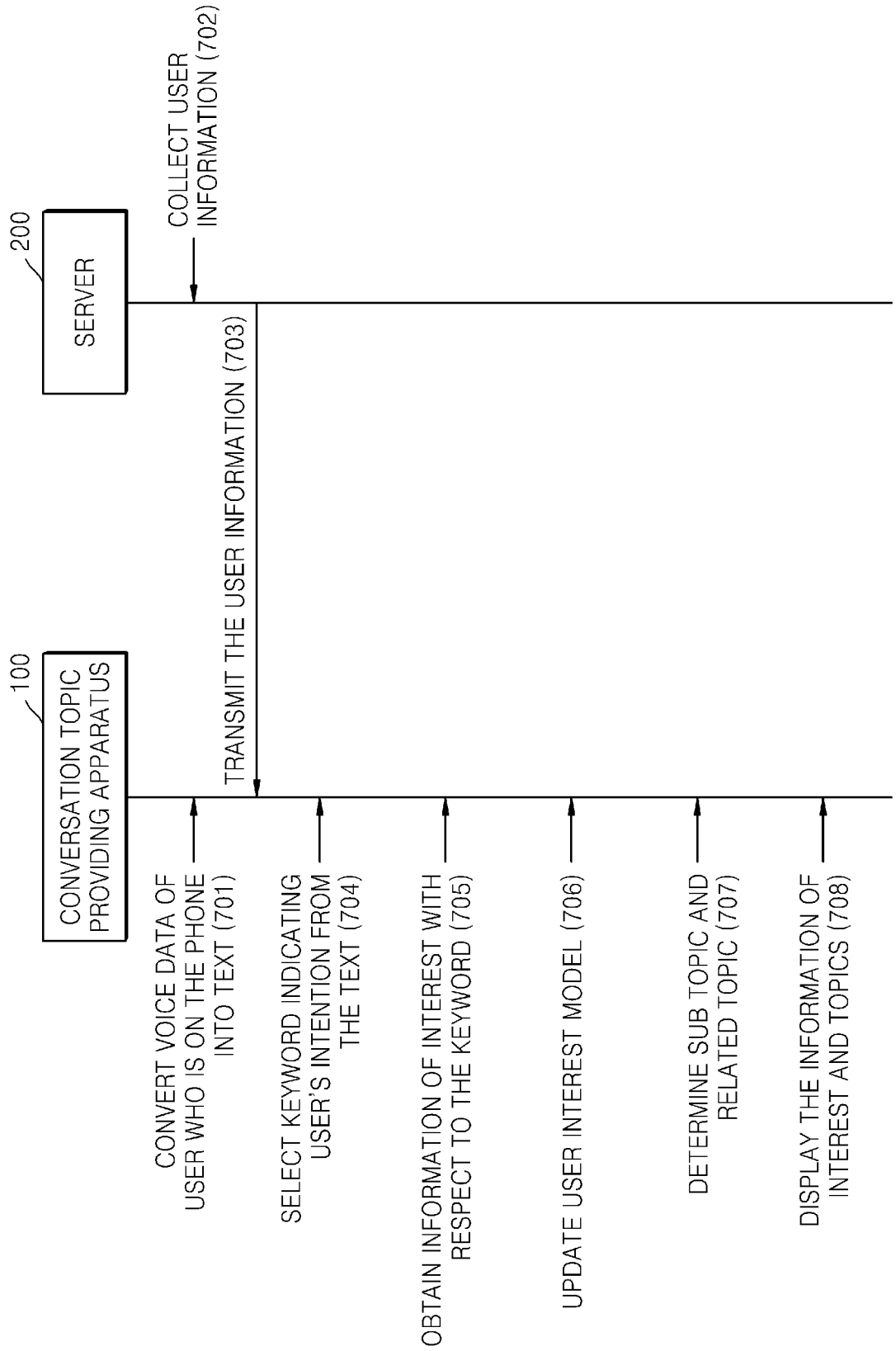
FIG. 7 is a block flow diagram of a conversation topic providing process, according to an exemplary embodiment.

FIG. 7 is a block flow diagram of a conversation topic providing process, according to another exemplary embodiment. Referring to FIG. 7, the conversation topic providing apparatus 100 and the server 200 transmit and receive information. FIG. 7 shows a process of main operations performed by the conversation topic providing apparatus 100.

The server 200 collects user information (operation 702) and transmits the user information to the conversation topic providing apparatus 100 (operation 703). In this exemplary embodiment the server 200 only performs the operation of transmitting the user information. Other operations are performed by the conversation topic providing apparatus 100.

The conversation topic providing apparatus 100 may perform an operation (701) of converting user voice data into text, an operation (704) of selecting a keyword indicating a user's intention from the text, and an operation (705) of obtaining information of interest with respect to the keyword.

The conversation topic providing apparatus 100 may perform an operation (706) of updating a user interest model. The user interest model may be updated when the user interest model is generated by or stored in the conversation topic providing apparatus 100.

The conversation topic providing apparatus 100 may perform an operation (707) of determining a sub topic and a related topic, and an operation (708) of displaying the information of interest and topics.

Figure 8:
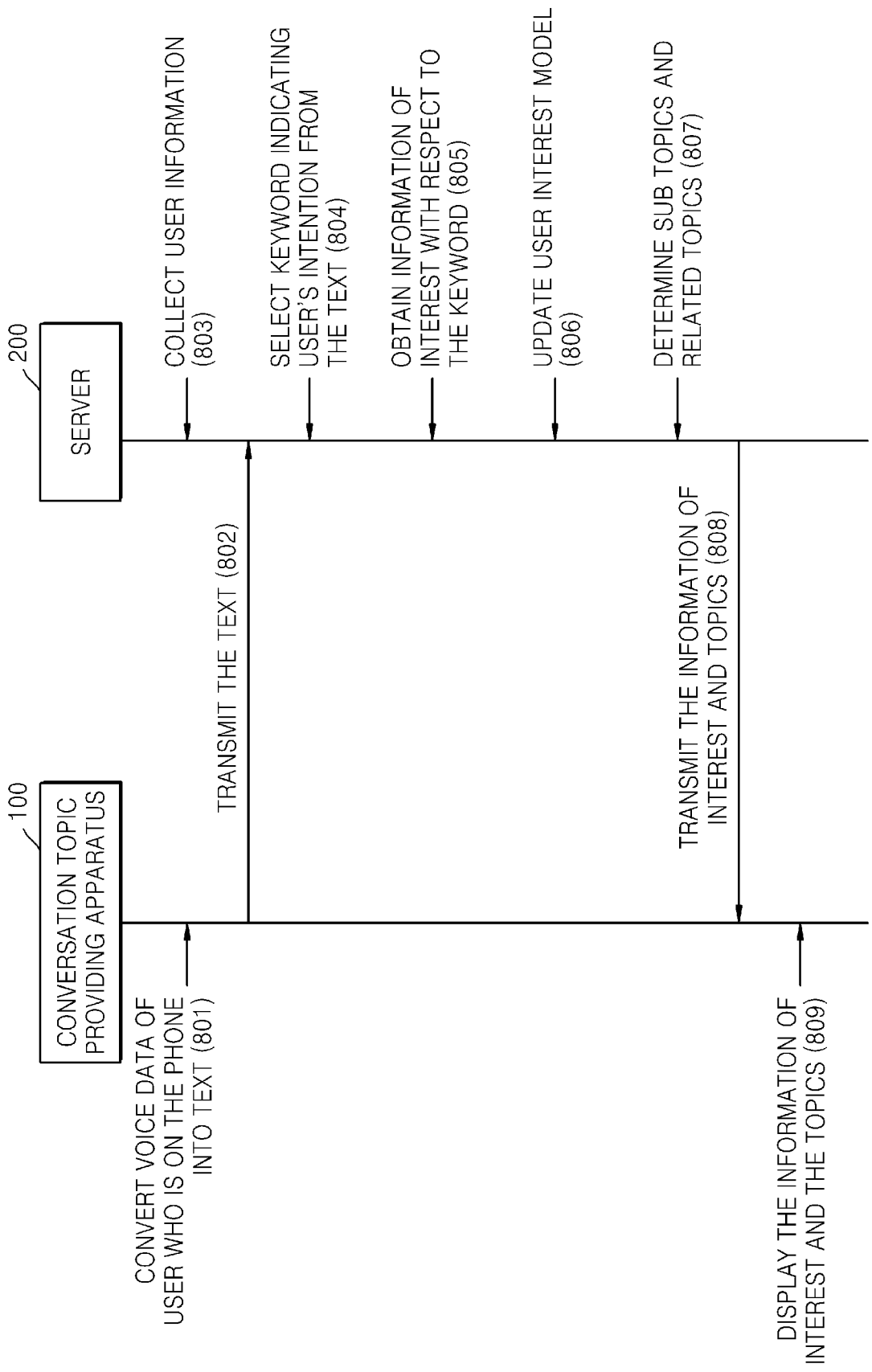
FIG. 8 is a block flow diagram of a conversation topic providing process, according to another exemplary embodiment.

FIG. 8 is a block flow diagram of a conversation topic providing process, according to another exemplary embodiment. FIG. 8 shows a process of main operations performed by the server 200.

The conversation topic providing apparatus 100 converts user voice data into text (operation 801), and transmits the text to the server 200 (operation 802).

The server 200 collects user information or a conversation history (operation 803). The server 200 may store the collected user information in the memory 240 thereof. The server 200 stores updated user information in the memory 240 during a predetermined period or when the user information is updated.

The server 200 may perform an operation (804) of selecting a keyword indicating a user's intention from the text, an operation (805) of obtaining information of interest with respect to the keyword, and an operation (807) of determining a sub topic and a related topic. Furthermore, the server 200 may perform an operation (806) of updating a user interest model.

If the information of interest is obtained and topics are determined, the server 200 transmits the information of interest and the topics to the conversation topic providing apparatus 100. The server 200 may determine how to display the information of interest and the topics. That is, the server 200 may determine locations or sizes of the displayed information of interest and the topics.

The conversation topic providing apparatus 100 may display the information of interest and the topics.

Figure 9:
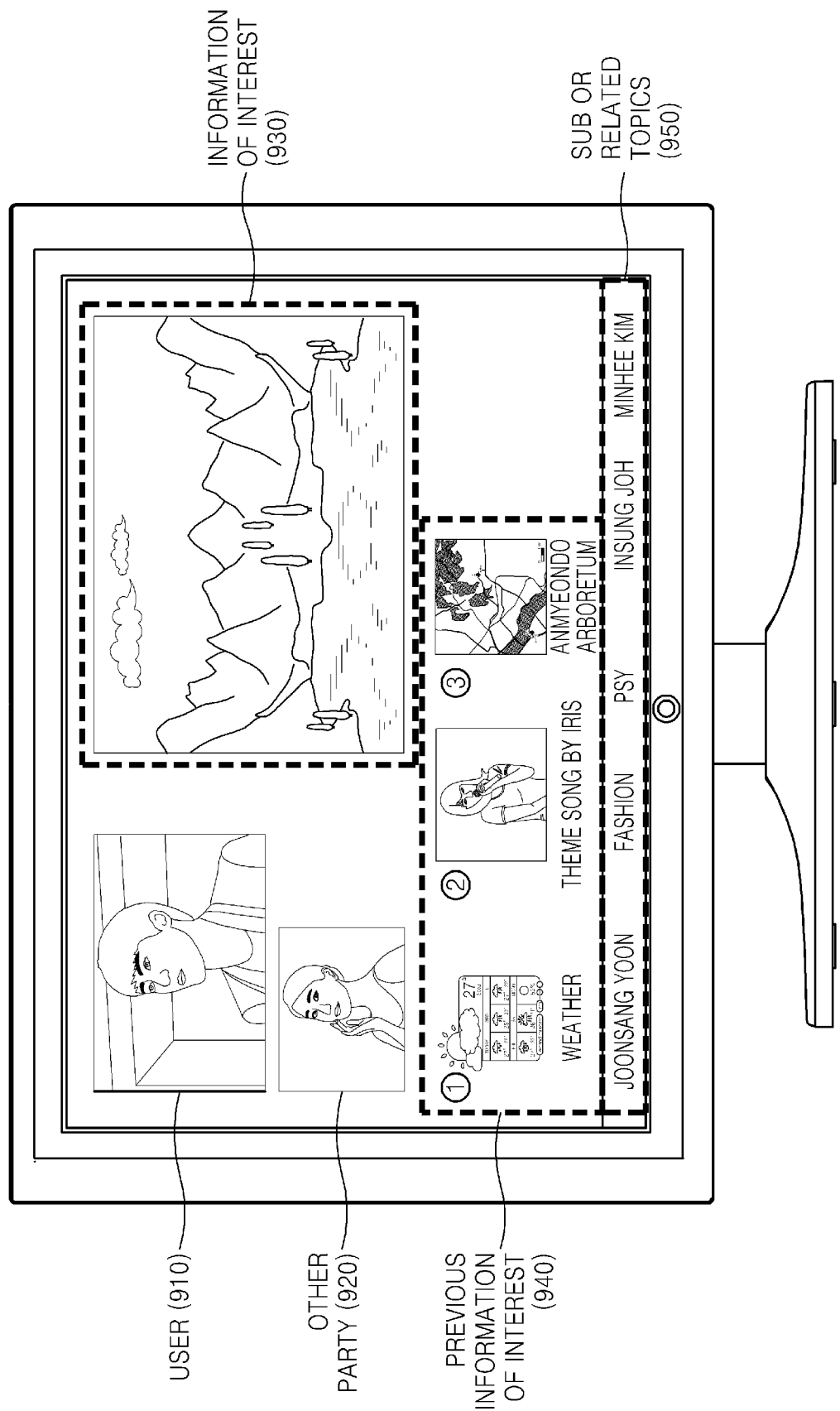
FIG. 9 is a diagram illustrating a conversation topic display method, according to an exemplary embodiment.

FIG. 9 is a diagram for explaining a conversation topic display method, according to an exemplary embodiment. FIG. 9 shows how a conversation topic on a digital television may be displayed while a user is on the phone.

A user 910 and the other party 920 are people who are currently on the phone with each other. Although a video call between the user 910 and the other party 920 is shown in FIG. 9, the call may also include a voice call or a multiparty call that is a call between two or more parties.

Information of interest 930 is information regarding a keyword about which the user 910 and the other party 920 converse. If the keyword is determined, the conversation topic providing apparatus 100 may search for the keyword and obtain information. The conversation topic providing apparatus 100 may select information corresponding to interests of the user 910 from the obtained information and display the selected information. In this regard, the selected information is the information of interest 930.

The information of interest 930 may be a kind of information. For example, the information of interest 930, such as information regarding a tourist site that the user 910 wishes to visit, may be a homepage of the tourist site. The conversation topic providing apparatus 100 directly displays the homepage of the tourist site, and thus the information regarding the tourist site is directly provided to the user 910.

The information of interest 930 may be a collection of a plurality of pieces of information. For example, the information of interest 930, such as the information regarding the tourist site that the user 910 wishes to visit, may be information including a list of restaurants or accommodations located near the tourist site. Alternatively, the information of interest 930 may be information about a location of the tourist site that the user 910 wishes to visit, how to get there, the homepage of the tourist site, contact information of the restaurants or accommodations located near the tourist site, and the like.

In FIG. 9, the information of interest 930 is in the largest display region. Although the information of interest 930 is displayed on a right upper side in FIG. 9, a display location or size of the information of interest 930 may be changed.

Previous information of interest 940 is previously selected information of interest. The previous information of interest 940 is displayed to be smaller than the information of interest 930. If the information of interest 930 is changed, content displayed as the information of interest 930 is displayed as the previous information of interest 940.

In FIG. 9, the previous information of interest 940 includes weather, a theme song by Iris, and Anmyeondo Arboretum. The weather, the theme song by Iris, and Anmyeondo Arboretum are keywords that have been displayed as the information of interest 930. The user 910 may select items displayed as the previous information of interest 940 to display as the information of interest 930. If the items displayed as the previous information of interest 940 are selected, the information of interest 930 and the previous information of interest 940 are updated. That is, locations of the selected previous information of interest 940 and the information of interest 930 are switched and displayed.

Sub topics or related topics 950 are displayed on the lowermost end of the conversation topic providing apparatus 100. The sub topics or related topics 950 may be selected by the user 910. The selected topics are displayed as the information of interest 930.

Figure 10:
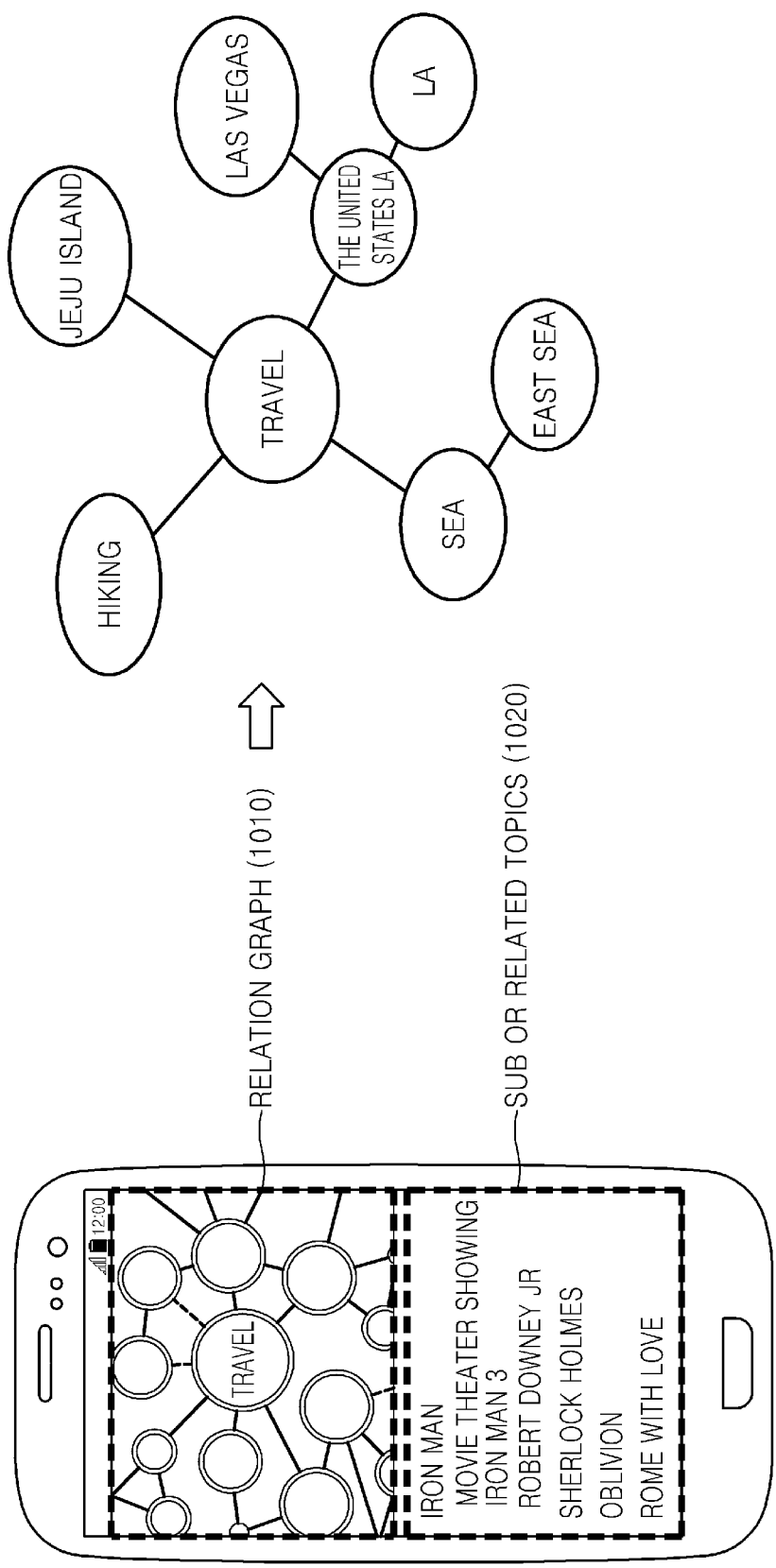
FIG. 10 is a diagram for explaining a conversation topic display method, according to another exemplary embodiment.

FIG. 10 is a diagram for explaining a conversation topic display method, according to another exemplary embodiment. FIG. 10 shows how to display information of interest or topics on a smart phone. A display region of the smart phone may be smaller than that of a television. Thus, the smart phone may be divided into upper and lower ends so that the information of interest may be displayed on the upper end and the topics may be displayed on the lower end. Alternatively, the smart phone may be divided into left and right sides so that the information of interest may be displayed on the left side and the topics may be displayed on the right side.

In FIG. 10, the display region of the smart phone is divided into the upper and lower ends. In FIG. 10, a relation graph 1010 is displayed on the upper end instead of the information of interest.

The relation graph 1010 shows relations between a keyword and the topics. For example, when travel is selected as the keyword, hiking, Jeju Island, the United States, the sea, and the like may be determined as sub or related topics. The topics may be determined as a previous tourist site of a user or tourist sites mentioned during a conversation of the user. Las Vegas or LA may be determined as a sub topic of United States travel among cities of the United States.

Sub or related topics 1020 are displayed as characters in the lower end of the smart phone. For example, when a movie is selected as the keyword, Iron Man, Sherlock Holmes, Oblivion, Rome With Love, and the like may be determined as the sub or related topics 1020. The topics may be determined among movies that are now playing or that the user has recently seen. A movie theater showing Iron Man 3 may be determined as a sub topic of Iron Man.

Similarly, Robert Downey Jr., the a name of a leading actor of Iron Man, may also be determined as a sub topic of Iron Man.

Figure 11:
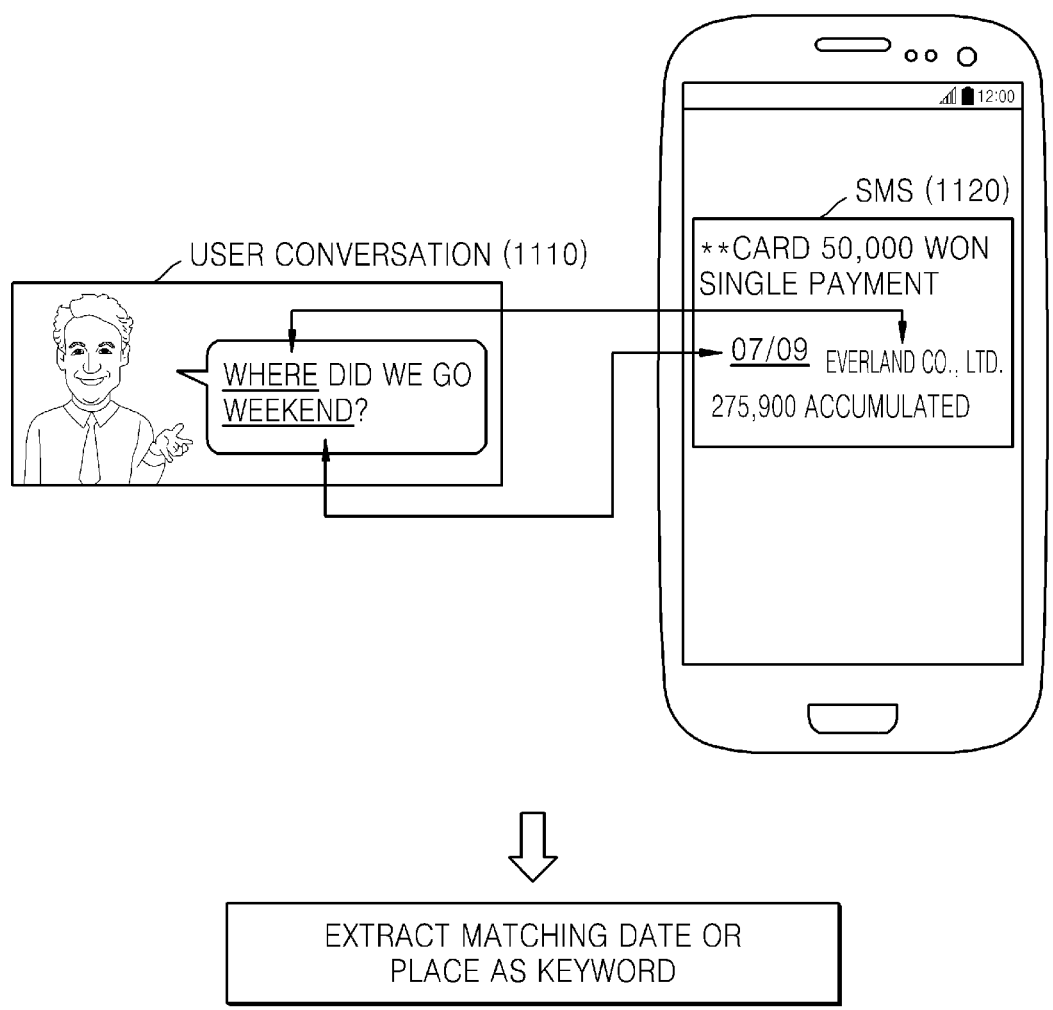
FIG. 11 is a diagram for explaining a conversation topic providing method, according to an exemplary embodiment.

FIG. 11 is a diagram for explaining a conversation topic providing method, according to an exemplary embodiment.

Referring to FIG. 11, the conversation topic providing apparatus 100 displays an SMS message 1120 including words matching words included in a user conversation 1110. A user may check the displayed SMS message 1120 to proceed with a conversation.

When an interrogative sentence "where did we go last weekend?" is detected from the user conversation 1110, the conversation topic providing apparatus 100 extracts words indicating a place, time, or people that are included in the interrogative sentence. The conversation topic providing apparatus 100 may also extract interrogatives indicating the place, time, or people that are included in the interrogative sentence. The conversation topic providing apparatus 100 searches for an SMS message or SNS message matching the words or interrogatives indicating the place, time, or people. The conversation topic providing apparatus 100 may display the found SMS message or SNS message or may extract and display information included in the found SMS message or SNS message.

There may be a case where the user does not remember something that was discussed in the past during the conversation. In this case, the conversation topic providing apparatus 100 searches for and displays a record of a user's SMS or SNS activity.

As an example, if the interrogative sentence "where did we go last weekend?" is detected from the user conversation 1110, the conversation topic providing apparatus 100 extracts a word indicating time "last weekend", and calculates a date of "last weekend". The conversation topic providing apparatus 100 searches for SMS messages received on the calculated date or SNS writings that the user has uploaded. The conversation topic providing apparatus 100 displays a SMS message including a word indicating a place among the SMS messages received on the calculated date. The conversation topic providing apparatus 100 displays an SNS writing including the word indicating the place among SNS writings of a user account that have been uploaded on the dates before and after the calculated date.

For example, the conversation topic providing apparatus 100 calculates that a date of "last weekend" included July 9. When a user's SMS message includes a card payment detail on July 9, the conversation topic providing apparatus 100 displays the card payment detail. The card payment detail provides information regarding a place that the user visited on July 9. If there are a plurality of card payment details on July 9, the conversation topic providing apparatus 100 displays the plurality of card payment details or extracts and displays places included in the plurality of card payment details.

When an interrogative indicating a place "where" is included in the user conversation 1110, the conversation topic providing apparatus 100 may extract the place as a keyword. That is, since the user is curious about the place that the user visited last weekend, the conversation topic providing apparatus 100 may extract "Everland" which is a word indicating the place as the keyword from an SMS message found from last weekend.

As another example, the conversation topic providing apparatus 100 may search for an SMS message or SNS writings when an interrogative includes at least two words indicating a place, time, or people.

As another example, the conversation topic providing apparatus 100 may search for an SMS message or SNS writings when one sentence includes both words and interrogatives indicating a place, time, or people.

As described above, according to the one or more of the above exemplary embodiments, information of interest and topics that reflect a user's conversation intention may be provided to a user who is on the phone.

According to the one or more of the above exemplary embodiments, information of interest, a sub topic, and a related topic are concurrently provided, and thus the user may select desired information.

According to the one or more of the above exemplary embodiments, a plurality of pieces of information reflecting a user's interest may be reconfigured and provided.

According to the one or more of the above exemplary embodiments, words indicating a place, time, and people that are detected during a user's conversation may be determined as keywords, and an SMS message and SNS writings including words matching the keywords in an SMS and SNS account of the user may be provided.

The one or more of the above exemplary embodiments may be written as computer readable code and may be implemented in general-use digital computers that execute the computer readable code using a computer readable recording medium. The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer readable code is stored/transferred and executed in a distributed fashion.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the appended claims.

What is claimed is:

1. A device comprising:
a display;
a memory storing one or more instructions; and
a processor configured to executing the one or more instructions to:
convert voice data of a conversation of a user into text during the conversation of the user;
determine at least one keyword from the text;
obtain detail information by searching for the at least one keyword and collecting information corresponding to interests of the user from a searched result;
determine conversation topics related to the at least one keyword using a user interest model and the at least one keyword; and
control the display to display both the detail information and the determined conversation topics during the conversation of the user, wherein the user interest model is generated by using information of the user and comprises a plurality of topic candidates.

2. The device of claim 1, wherein the processor is further configured to determine sub topics which correspond to a sub concept of the at least one keyword, and determine related topics which correspond to a concept equivalent to the at least one keyword in consideration of the information of the user.

3. The device of claim 1, wherein the conversation topics are determined by inputting the at least one keyword into the user interest model.

4. The device of claim 1, wherein the processor is configured to control the display to display, when the user selects one of the displayed conversation topics, the selected display conversation topic as the detail information.

5. The device of claim 1, wherein the user interest model being updated by correcting a weight given to each of the plurality of topic candidates when the information of the user is updated.

6. The device of claim 1, wherein, when a word such as a place, time, or a person is detected from the text, the processor is configured to determine the word indicating the place, the time, or the person as the at least one keyword.

7. The device of claim 6, wherein the processor is configured to search for a word identical to the word indicating the place, the time, or the person in an SMS or SNS message of the user, and determine the SMS or SNS message of the user including the identical word as the detail information with respect to the at least one keyword.

8. The device of claim 1, wherein the processor is configured to extract the information corresponding to the interests of the user from the searched result, and reconfigure the extracted information.

9. The device of claim 1, wherein the processor is configured to control the display to display previous detail information that was previously obtained and displayed,
wherein the previous detail information is displayed to be smaller than the displayed previous detail information.

10. The device of claim 1, wherein the processor is configured to control the display to display the detail information in a largest display region and the conversation topics on a lowermost display region.

11. A method performed by a device, the method comprising:
converting voice data of a conversation of a user into text during the conversation of the user;
determining at least one keyword from the text;
obtaining detail information by searching for the at least one keyword and collecting information corresponding to interests of the user from a searched result;
determining conversation topics related to the at least one keyword using a user interest model and the at least one keyword; and
displaying both the detail information and the determined conversation topics during the conversation of the user,
wherein the user interest model is generated by using information of the user and comprises a plurality of topic candidates.

12. The method of claim 11, wherein the determining the conversation topics comprises: determining sub topics which correspond to a sub concept of the at least one keyword; and
determining related topics which correspond to a concept equivalent of the at least one keyword in consideration of the information of the user.

13. The method of claim 11, wherein the conversation topics are determined by inputting the at least one keyword into the user interest model.

14. The method of claim 11, further comprising displaying, when the user selects one of the displayed conversation topics, the selected conversation topic as the detail information.

15. The method of claim 11, wherein the user interest model being updated by correcting a weight given to each of the plurality of topic candidates when the information of the user is updated.

16. The method of claim 11, wherein when a word such as a place, time, or a person is detected from the text, the determining the at least one keyword comprises determining the word indicating the place, the time, or the person as the at least one keyword.

17. The method of claim 16, wherein the obtaining the detail information comprises:
searching for a word identical to the word indicating the place, the time, or the person in an SMS or SNS message of the user; and
determining the SMS or SNS message of the user including the identical word as the detail information with respect to the at least one keyword.

18. The method of claim 11, wherein the obtaining the detail information comprises:
extracting the information corresponding to the interests of the user from the searched result; and
reconfiguring the extracted information.

19. The method of claim 11, further comprising displaying previous detail information that was previously obtained and displayed,
wherein the previous detail information is displayed to be smaller than the displayed previous detail information.

20. The method of claim 11, wherein the displaying both the detail information and the determined conversation topics comprises displaying the detail information in a largest display region and the conversation topics on a lowermost display region.

* * * * *